Dec. 12, 1933.  W. K. EDWARDS  1,939,544
TANK VALVE
Filed Feb. 23, 1932    3 Sheets-Sheet 2

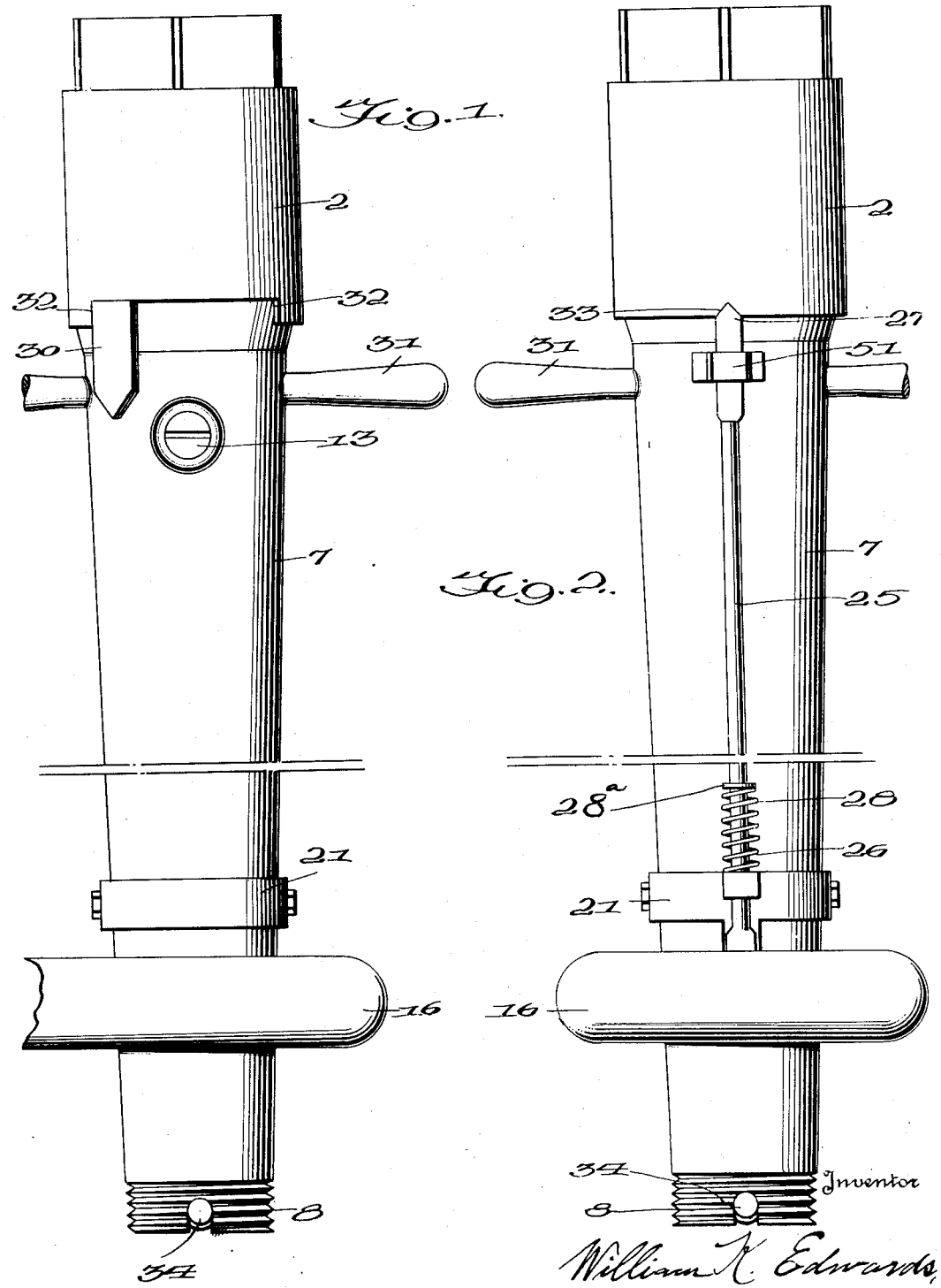

Inventor
W. K. Edwards
By
Mason & Mason Attorneys

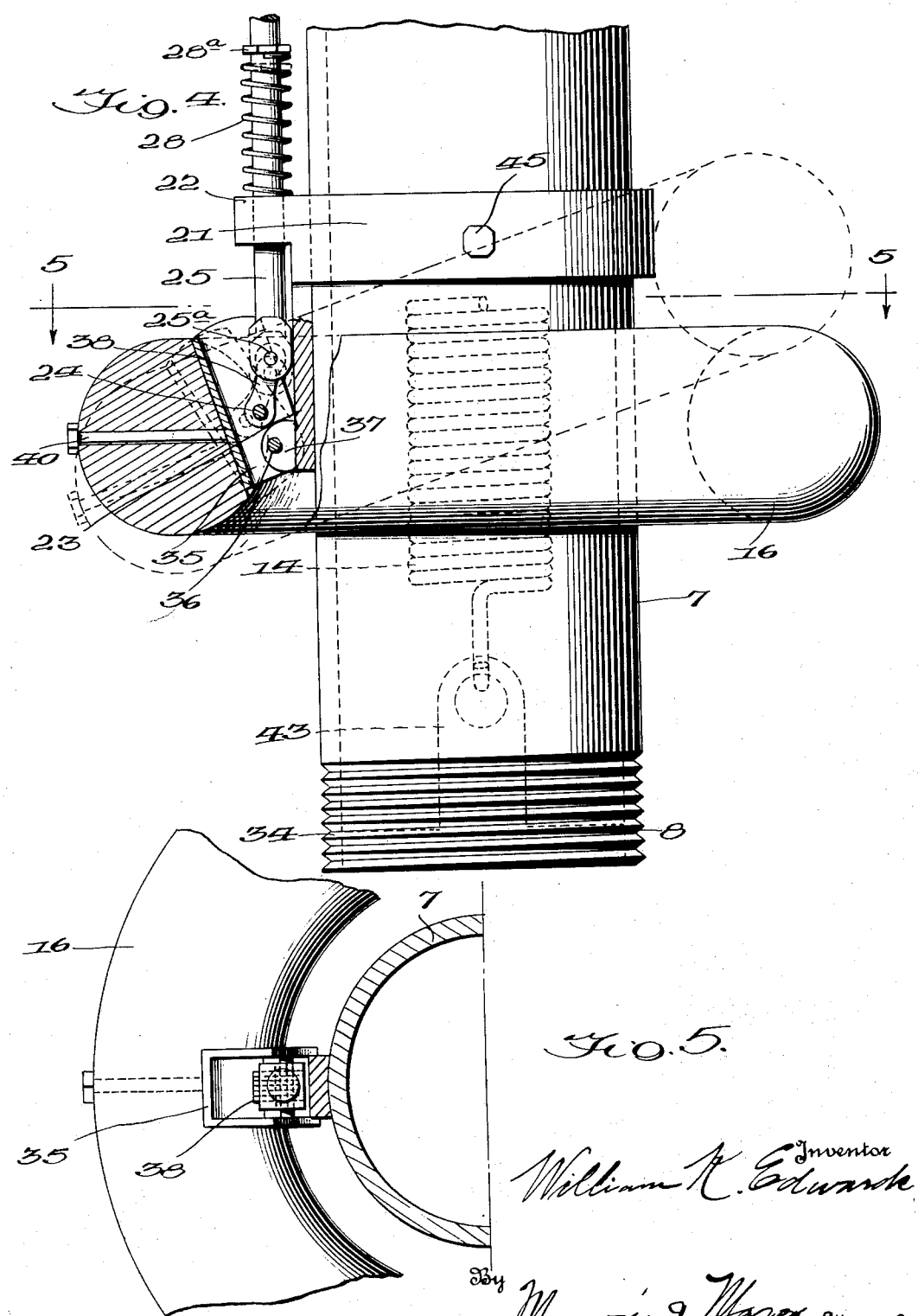

Patented Dec. 12, 1933

1,939,544

UNITED STATES PATENT OFFICE 1,939,544

TANK VALVE

William K. Edwards, Fort Worth, Tex.

Application February 23, 1932. Serial No. 594,677

4 Claims. (Cl. 226—127)

This invention relates to certain improvements in valves for controlling the admission of fluid to reservoirs, tanks, and the like, and is herein shown as applied to a valve of the general character, and having in view the purposes of that disclosed in my prior U. S. Letters Patent No. 1,821,622, granted Sept. 1, 1931.

The present improvements have to do with certain devices for insuring prompt response of the valve to the controlling fluid, whereby when the liquid level in the tank rises above a predetermined point, the valve may be closed quickly, and positively to the end that there will be no delay or incertainty in the prompt action of the parts.

Other features of the invention relate to reduction in the number of parts, simplicity of the elements necessary to perform the functions stated, and reliability of operation thereof.

Valves of the character herein shown are useful in various industries where it is desired to employ a float-actuated controlling means for the liquid which is supplied to the tank to replace withdrawals therefrom, and such valves are useful in oil refineries, in filling tank cars for shipment, and other situations where valves of this character are employed, and where a reliable automatic means for closing the valve, which has been manually opened, is desired.

The particular features of improvement embodied in the present invention will be apparent from the following detailed description when considered in connection with the accompanying drawings, and the novel features of the invention will be hereinafter pointed out in the appended claims, In the drawings:—

Fig. 1 is a view in side elevation of one form of my invention;

Fig. 2 is a similar view of the same parts viewed from the opposite side;

Fig. 4 shows a portion of the discharge spout in side elevation, the operating float, and connections between the float and latch rod, with certain parts in section, and Fig. 5 is a sectional detail view on the line 5—5, Fig. 4.

Figure 3:
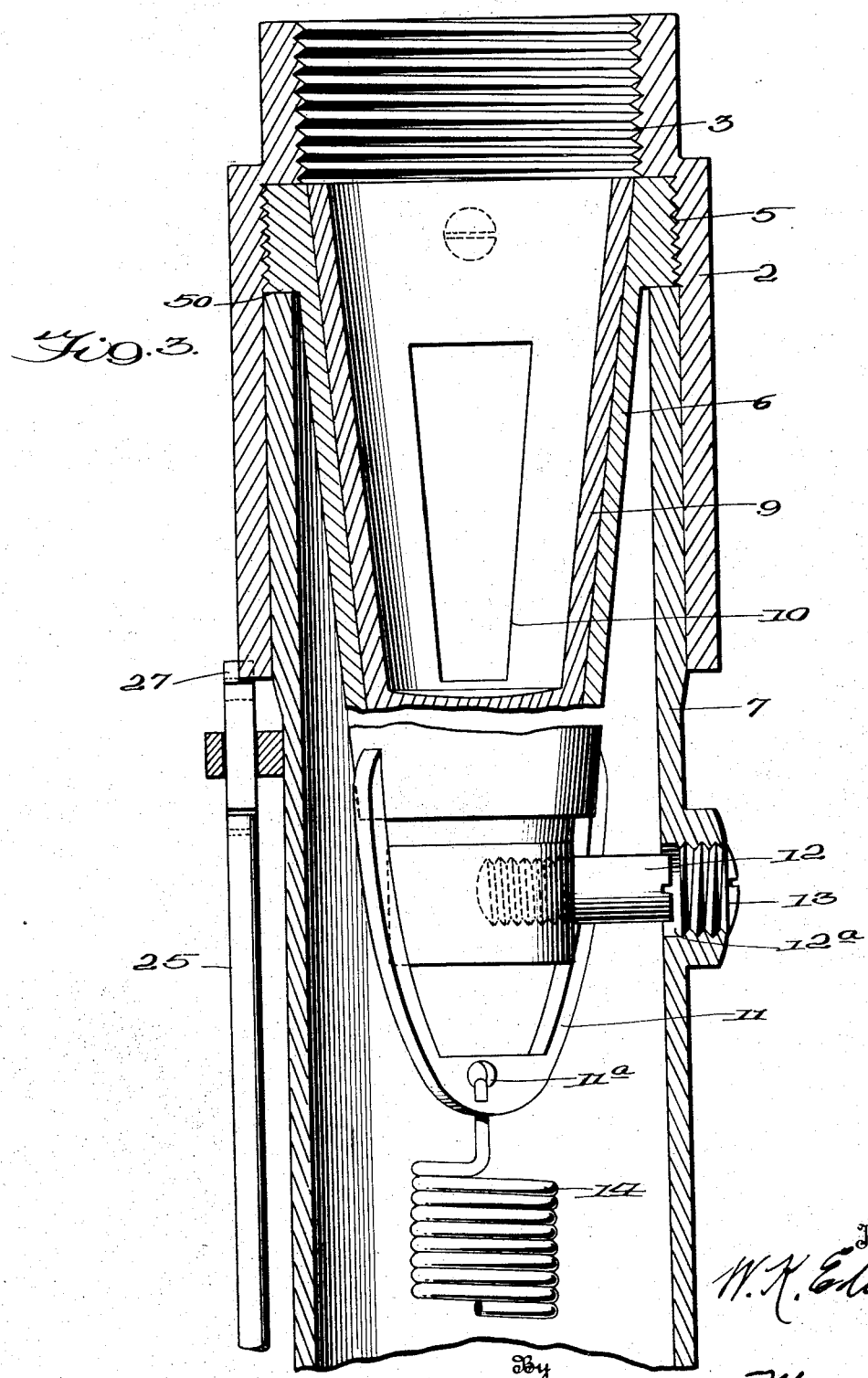
Fig. 3 is an enlarged view in longitudinal section through the valve and discharge spout, with the latch rod and some other parts in elevation.

The tank inlet coupling nipple 2 is provided at its upper end with an internal thread 3 for connection with a liquid supply pipe. The nipple 2 has below the threaded portion 3 an enlargement provided with internal threads 5 for connection with an externally threaded enlarged portion of the tapering valve seat 6, and received within the enlarged portion of the nipple 2 is the upper end of the discharge spout 7 which extends downwardly a suitable distance, being conveniently provided at its lower end with an external thread 8 to receive a discharge nozzle or nipple of suitable form, when desired. The upper extremity of the discharge spout 7 is received rotatably within the nipple 2 and its extreme end abuts against a shoulder 50 provided by the enlargement of the valve seat 6. The conical valve seat 6 receives a hollow conical valve 9 which is rotatably supported within the seat and provided with a valve port 10, which, when the valve is open, registers with a port in the casing 6. When the valve is turned so that the port 10 is out of registry with the port in the casing, the flow of liquid through the valve is shut off.

Rigidly connected with the lower end portion of the tapering valve seat 6 is a shackle or loop 11 provided with a perforation 11a to which is connected the upper end portion of a torsion spring 14. The lower end of the spring 14 (see Figs. 1 and 4), may be anchored to a plate 43 by hooking through a hole therein, said plate being provided at its lower extremity with a cross bar 34 which seats in diametrically opposite notches or recesses in the lower end of the spout 7. By lifting the cross bar 34 out of the notches and suitably rotating the same, the tension of the spring 14 may be increased or decreased at will. This spout 7 is, accordingly, sustained with its upper end portion in rotative engagement with the interior of the nipple 2 through the connection of the spring 14 with the loop 11, which latter is in rigid connection with the valve seat 6, the latter in turn being in rigid connection with the nipple 2.

The upper portion of the spout 7 is herein shown as provided with oppositely extending handles 31, 31, arranged below the nipple 2, and serving to provide manual means for rotating the spout, and hence the rotary valve 9 which is connected to and is rotated by the spout through the instrumentality of pin 12 which passes through an aperture 12a in the side of the spout and is threaded at its inner end to an internally threaded socket in the lower portion of the cone valve 9. The pin 12 may be inserted or removed when desired in the assembling of the parts, and when the pin is in position the aperture 12a may be conveniently closed by a screw plug 13.

It will be seen from the foregoing that this valve differs from that disclosed in my prior patent above referred to, in at least one respect, namely, that whereas in the patent the inner valve cone is rotated manually relatively to its fixed cone-shaped seat in opening the valve, while the spout remains stationary, in the present case the opening movements of the valve are secured through a rotary movement of the spout transmitted to the valve through the pin 12.

In opening the valve rotary motion is imparted to the spout, as above stated, and in turn to the inner cone or valve proper, through the connection afforded by the pin 12 and the opening 12a in the spout. Reverse movement of the parts to close the valve is effected, as in my previous construction, through the reaction of the torsion spring, the valve being held in open position by a latching device which latter is released when the liquid in the tank or receptacle rises to a predetermined point, thereby moving upward a float which releases the latch and permits the valve to be closed by the torsion spring, which then unwinds. The parts for accomplishing the closing movement of the valve in the present case comprise a latch rod 25, the same being guided for movements into and out of latching position by a loop 51 secured to the upper portion of the spout, and a guiding aperture through a lug 22, which projects laterally from a collar 21, secured to the spout by a set screw 45, or other device, the collar being located near the lower end portion of the spout, and above the float. The latch rod 25 is provided at its upper end portion with a sharpened end 27 which is arranged to enter a V-shaped notch 33 formed in the lower edge of the nipple 2. Upon the opposite side of the nipple 2 the lower edge of the latter is cut away to form two spaced stop shoulders 32, which are engaged by a stop 30, secured to the spout, as by welding, and adapted to play between the two shoulders 32 which delimit the valve, in its opening and closing movements. When the valve is rotated by the handles 31 in a direction to open it, the stop 30 is against the left hand shoulder 32, as shown in Fig. 1. When so positioned, the notch 33 will have been brought over the end 27 of the rod 25 which, through a spring 28, confined between the upper edge of the lug 22 and a collar 28a on the rod, holds the latch rod in the notch and the valve in open position. The spring 14 is then under tension and will rotate the valve to close the same when permitted to do so by withdrawal of the latch rod 25 from the retaining notch 33.

Surrounding the spout 7 and below the collar 21 is a controlling float 16. This float is provided in one edge portion with a recess to receive a bracket 35, herein shown as of U-form in cross section and secured to the float by a bolt 40, rigidly connected at its inner end to the bracket, extending through the float and having its threaded outer end provided with a nut, as shown. The collar 21 is provided with a downwardly extending portion 23 having a lug 37 to receive a hinge pin 36 which passes through the lug and bracket and hinges the float to one side of the spout, as shown. The float is of annular form and surrounds the spout with just sufficient clearance (see Fig. 5) between the float and spout to permit a relatively slight movement of the float about the pin 36, which is the center on which it turns.

The lower end of the rod 25 is herein shown as forked to receive a link 38 which is pivoted at one end 25a between the bifurcations, and its other end is connected to the bracket 35 by a pin 24. The link connection between the rod 25 and float provides for the transmission of the oscillating movements of the float to the reciprocating rod, without binding, as the float rises and falls under differences of liquid level in the tank.

With the parts as shown in full lines in Figs. 1, 2 and 4 of the drawings, the float occupies the position where the liquid in the tank has reached its low level, the link 38 connecting the float and latch rod being then substantially straight. In this position of the several parts, the valve has been opened by rotation of the spout one quarter turn, through the application of manual power to the handles 31, and the stop 30 is against the left hand shoulder 32, the upper end 27 of the latch rod being beneath the notch 33 in which it was caused to enter by the spring 28. As the water rises in the tank the float 16 is moved finally to the position shown in dotted lines in Fig. 4 which swings the link 38 out of substantial alignment with the rod 25, and through such link pulls the rod down so as to withdraw its end 27 from the retaining notch 33, thus releasing the spout from locking engagement with the stationary nipple 2, and permitting the spring 14 to close the valve instantly, by imparting a quarter turn to the cone 9 and bringing the latter into such position that its port 10 is out of registry with the port in the valve seat 6. This shuts off the further flow of water into the tank when the level thereof has reached that for which the float 16 is set. The parts will remain in this position with the valve closed, and the float and connections therebetween and the latch rod, as shown by dotted lines in Fig. 4, until the liquid has been withdrawn from the tank sufficiently to permit the float to fall into its normal position as shown by full lines in Fig. 4, where the link 38 has been moved into substantial alignment with the latch rod 25, permitting the latter to be moved upwardly by its spring 28 which forces the end 27 against the lower edge of the nipple 2, and in position to enter the notch 33 when the valve has been again manually opened by imparting to the spout a quarter turn in the proper direction to effect such opening, as heretofore described. The device may be a permanent part of the tank, or a part of a pipe line and inserted into each tank at the time of filling, as will be obvious, without changing the principles of the invention.

The right is reserved to make such changes in the specific construction of the details herein illustrated, in their relative arrangement as will be contemplated by the scope of the invention as set forth in the following claims.

I claim:—

1. In a device of the class described, the combination of an inlet coupling nipple, a valve seat rigid therewith, a conical valve in said seat, a rotatable spout connected with said nipple, a torsion spring connecting said valve seat and spout, a float surrounding said spout and arranged for movement in response to differences in liquid level, a latch connected with said spout and arranged to hold the spout and valve in such position that the valve is open, and connections between said latch and float arranged for actuation by the float as the latter rises to release said spout and valve and permit valve closing movement thereof.

2. In a device of the class described, the combination of a coupling nipple provided with a conical valve seat having a port, a hollow conical valve fitting within said seat and having an aligning port, a spout extending downwardly from said nipple and connected for rotary movements relatively to said nipple, a torsion spring having one end connected with said valve seat and its opposite end connected with said spout and normally acting to move said spout and valve into a position with the valve port out of registry with the port in the valve seat, a hollow float associated with said spout, a latch rod for holding the spout and valve in such position that the port in said valve and seat are in registry, and connections between said float and latch rod whereby when the float rises the latch rod is withdrawn from latching engagement and the valve and spout are permitted to rotate to a position where the ports in said valve seat and valve are out of registry.

3. In a tank valve, the combination of an inlet coupling nipple having a conical valve seat therein and rigid therewith, a hollow rotary valve rotatable in said valve seat, a rotary discharge spout surrounding said valve and seat and connected with said valve, a torsion spring connected at one end with said valve seat and at its other end with said spout, a spring actuated latch rod supported for movements toward and from said nipple and arranged to engage a notch therein for holding the spout and valve in open position against the stress of said torsion spring, manual means for rotating the spout for opening the valve thereby placing said spring under tension, a float surrounding said spout, means for pivotally supporting said float at one side of said spout, and a link connecting the lower end of said latch rod with said spout.

4. In a device of the class described, the combination of an inlet coupling nipple containing a hollow conical valve seat provided with a port, a rotary valve fitted to said seat and provided with a port adapted to register with the port in the seat when the valve is in open position, a discharge spout surrounding said valve and seat and extending downwardly therefrom, a pin arranged to be inserted through an aperture in said spout and connected with said valve for operatively joining said spout and valve, a torsion spring connecting said valve seat and spout, a spring actuated latch rod guided for movements in parallelism with said spout and having its upper end constructed to enter a notch in said coupling nipple to hold the valve and spout in such position that the valve port is out of registry with the port in the valve seat, stop means carried by said nipple and spout for limiting the opening and closing movements of the valve, manual devices for rotating the spout, a float surrounding said spout and pivotally connected thereto at one side of the spout, and a toggle connection between said float and the lower end of said latch rod.

WILLIAM K. EDWARDS.